United States Patent Office 2,710,543
Patented June 14, 1955

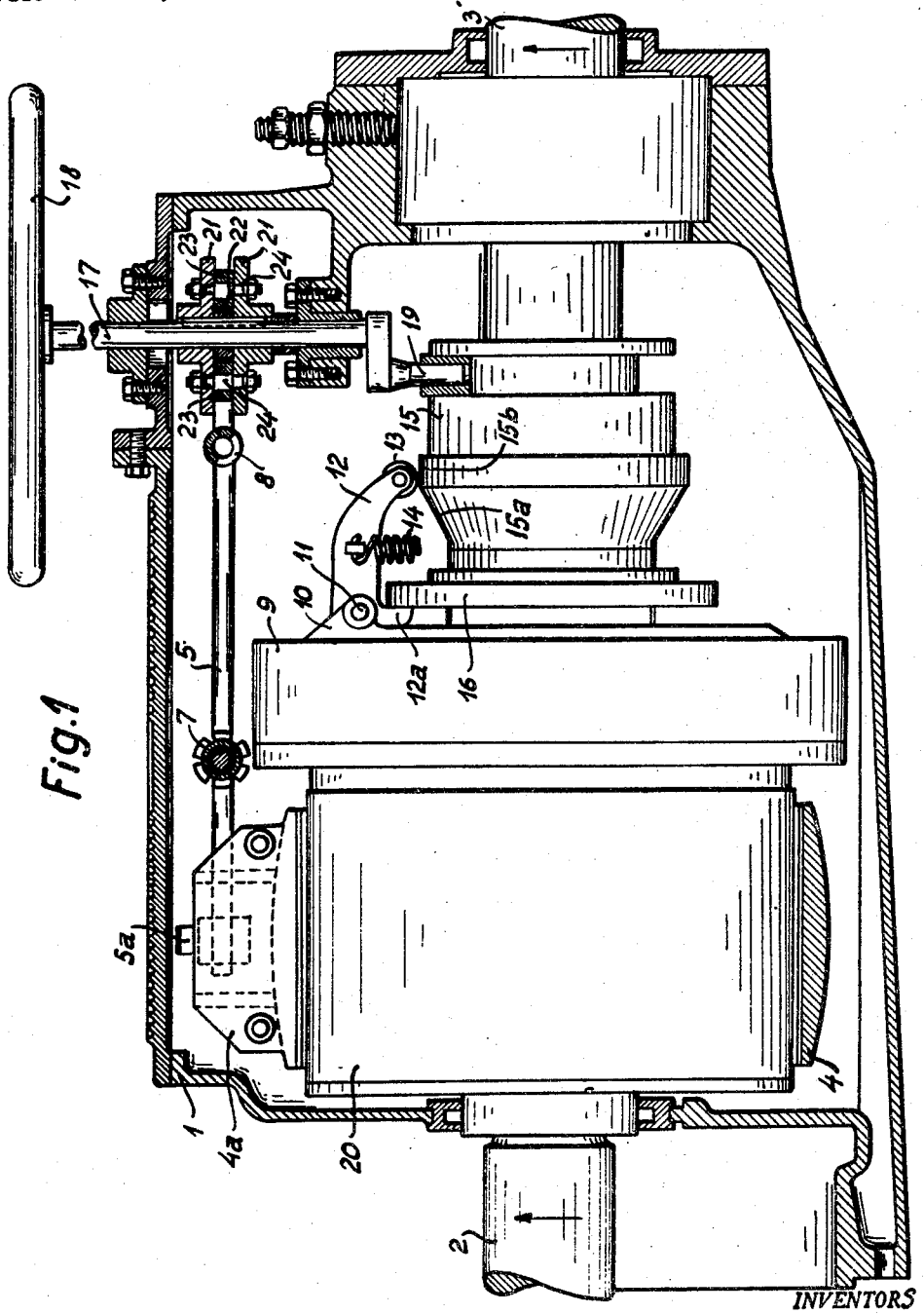

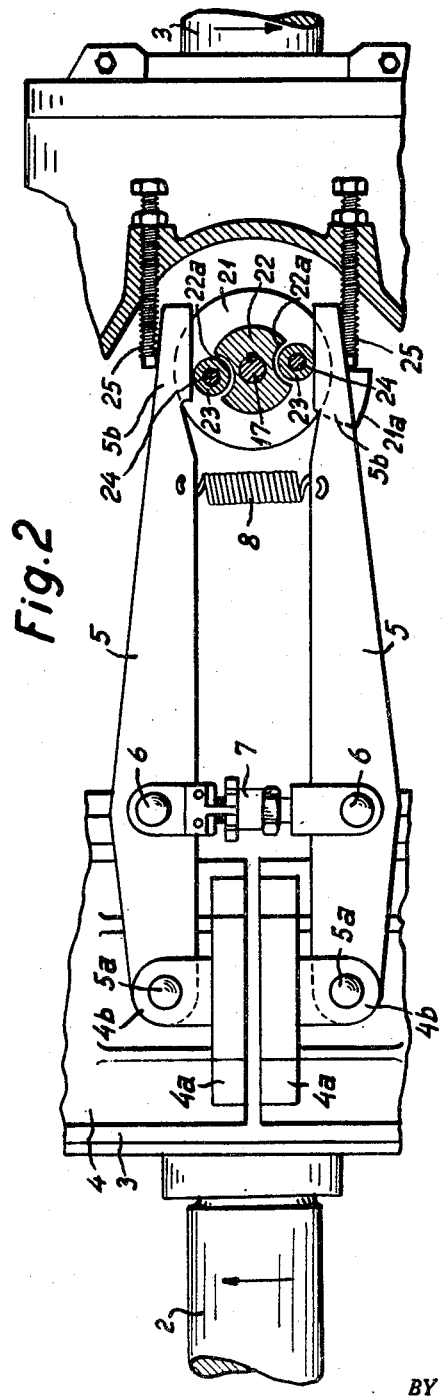

2,710,543

CONTROL MECHANISM FOR GEARS AND THE LIKE

Arthur Anker Krogh and Axel Kroldrup, Frederikshavn, Denmark

Application June 25, 1948, Serial No. 35,108

Claims priority, application Denmark July 8, 1947

3 Claims. (Cl. 74—96)

The present invention relates to a control mechanism particularly for reversing gear of the kind in which a motion in one direction is transmitted from a driving shaft to a driven shaft through bevel gears or similar members and a coupling while motion in the other direction is effected by the release of the coupling and a simultaneous fixing of the shafts for the driving members.

An object of the invention is to provide a construction wherein a control member is provided for simultaneously influencing the operation of the clutch and a brake.

A further object of the invention is to provide a construction which is simple and effective so that the gear is easily operated and at the same time the various parts of the gear are protected against outer stresses and against dust and dirt.

A still further object of the invention is to provide a control member in the form of a spindle preferably provided with a hand wheel and the spindle may be led out through a stuffing box in order to effectively prevent the entry of dust or dirt into the gear.

A further object of the invention is to provide eccentrically mounted means upon the operating spindle for effecting the operation of levers controlling a brake.

With the above and other objects in view which will become apparent from the detailed description below, one form of the invention is shown in the drawings in which:

Figure 1 is a side elevation with parts in section of the control mechanism for a reversing gear, and Figure 2 is a partial plan view of the structure shown in Figure 1.

In Figure 1 a completely closed gear box or casing is shown at 1 containing the gear, with the driving shaft indicated at 2 and the driven shaft at 3. A drum 20 is mounted loosely on the driving shaft 2 and the driven shaft 3. The adjacent ends of the shafts 2 and 3 are located within the drum at approximately the center thereof.

On each of the two shaft ends there is mounted a bevel gear which gears are both in engagement with bevel gears journalled on the shafts or pins which are secured to the inside of the drum 20 and extend at right angles to the common axis for the shafts 2 and 3. The gears normally act as drivers for the direct transmission of motion from the driving shaft 2 to the driven shaft 3. The gears in such case do not rotate in relation to one another and the drum 20 which may be rigidly coupled to the driven shaft 3 by means of a coupling described below will also participate in the rotation.

In order to reverse the motion the coupling has to be released and the drum 20 fixed whereby motion is transmitted through the various bevel gears which will then rotate in relation to one another. The gear wheels are not shown on the drawing since they do not form any part of the invention.

In order to fix the drum 20 the brake band 4 is provided. The brake band is provided with projecting parts 4a at its ends and projections or lugs 4b are fixed to the parts 4a. A pair of levers 5 are connected at one of their ends to the projections 4b by means of pins 5a. The levers 5 are journalled on pins 6 which are interconnected by an adjustment screw device 7 so that the spacing between the pins 6 may be regulated. A spring 8 interconnects the levers 5 in the vicinity of the ends 5b urging the ends 5b towards one another which tends to separate the pins 5a in order to loosen the brake band 4.

The drum 20 is rigidly connected to a coupling part 9 which is also freely rotatable with respect to the shafts 2 and 3. The coupling part 9 cooperates with a movable coupling part 10 and the coupling parts 9 and 10 with their mutually cooperating coupling surfaces, not shown, may be made in any desired way. On the movable coupling part 10 there is secured by means of a pin 11 a latch 12 which at its free end carries a roller 13 cooperating with a sliding sleeve 15 provided on the driven shaft 3. A spring 14 urges the roller 13 into contact with the sleeve 15 which as shown in Figure 1 is provided with a cylindrical surface 15b and a conical surface 15a.

In the position shown in Figure 1 the roller 13 is positioned on the cylindrical surface 15b and in this position a hook 12a provided on the latch 12 is pressed firmly against a shoulder 16 provided upon the shaft 3. In the position shown in Figure 1 the coupling parts 9 and 10 are engaged.

The gear is operated by means of a spindle 17 having a hand wheel 18. The spindle 17 may also be arranged for operation by remote control either mechanically or otherwise. On the lower end of the spindle 17 there is mounted a crank 19 in engagement with the sleeve 15 so that a rotation of the spindle 17 will cause a displacement of the sleeve 15. There is also mounted on the spindle 17 two discs 21 which are keyed thereto. The discs 21 are spaced by means of an intermediate piece 22 of a smaller diameter than the discs 21. The intermediate piece 22 is provided with a pair of diametrically oppositely disposed circular arc shaped cuts 22a and mounted so as to project into the latter are two rollers 23 journalled on pins 24 secured to the discs 21. The construction is such that the greatest distance between the outer sides of the two rollers is somewhat greater than the diameter of the intermediate piece 22. To the casing 1 there are secured adjustable screws 25 which serve as abutments or stops for a projection 21a on the lower one of the discs 21.

In the position of the gear shown in Figure 1, the coupling 9, 10 is, as mentioned before, engaged, and the brake band 4 is slack, so that the drum 20 together with the coupling can rotate together with the shafts 2 and 3, and the motion thus be transmitted from the driving shaft 2 to the driven shaft 3 by driving through the bevel gears.

If reversing be desired, the spindle 17 is turned from the position shown in Figure 1, e. g. anticlockwise in Figure 2, whereby the crank 19 forces the sliding sleeve 15 to the right. The roller 13 will on account of the pull of the spring move down the conical surface 15a, and the hook 12a will be led away from the shoulder 16, and the coupling 9, 10 will finally be released so that the coupling part 9 and the drum 20 will no longer be forced to follow the shaft 3. By turning the spindle 17 the drum 20 will be blocked, the brake band 4 being tightened by the levers 5 as the rollers 23 force the lever ends 5b apart so that the pins 5a will lead the ends of the brake band towards each other.

As shown in Figure 2, the lowest of the screws 25 serves in combination with the projection 21a for limiting the rotation of the roller discs 21 and the rollers 23, so that these are stopped a little after they have passed the dead point position in relation to the lever ends 5b, whereby is ensured that the rollers 23 and thereby the levers 5 are fixed in their positions under the influence of the pull of the spring 8, so that after having been tightened the brake band cannot once more be slackened until a rotation in the opposite direction to that of the spindle is performed.

The spindle can be fixed in an intermediate position in which the coupling 9, 10 is disengaged, but the drum 20 not yet blocked, so that no motion is transmitted from the driving to the driven shaft either in one or the other direction. The projection 21a may be so dimensioned that such an intermediate position is achieved by turning the spindle 17 clockwise in Figure 2 until the projection 21a abuts on the upper one of the screws 25 so that the spindle may be arranged for being locked in a particular position.

The adjustability of the spacing between the pins 6 and of the screws 25 makes it possible to adjust the mounting of the gear and to compensate for wear which might have arisen.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. An operator for operating a device comprising a pair of spaced pivoted levers, said operator comprising a rotatable spindle, means for rotating said spindle at one end thereof and a carrying member fixed on said spindle intermediate the ends thereof, a pair of rollers eccentrically mounted on said carrying member, said rollers being adapted for coaction with said pair of spaced pivotal levers for separation thereof, said rollers being operable on rotation of said spindle, said carrying member comprising two spaced discs keyed onto said spindle, an intermediate piece between said spaced discs of smaller diameter than said spaced discs, said intermediate piece having a pair of diametrically oppositely disposed circular arc shaped cuts in the periphery thereof, pins fixed to said spaced discs and partially projecting into said cuts in said intermediate piece, said rollers being rotatably journalled on said pins.

2. An operator for operating a device comprising a pair of spaced pivoted levers, said operator comprising a rotatable spindle, means for rotating said spindle at one end thereof and a carrying member fixed on said spindle intermediate the ends thereof, a pair of rollers eccentrically mounted on said carrying member, said rollers being adapted for coaction with said pair of spaced pivotal levers for separation thereof, said rollers being operable on rotation of said spindle, said carrying member comprising two spaced discs keyed onto said spindle, an intermediate piece between said spaced discs of smaller diameter than said spaced discs, said intermediate piece having a pair of diametrically oppositely disposed circular arc shaped cuts in the periphery thereof, pins fixed to said spaced discs and partially projecting into said cuts in said intermediate piece, said rollers being rotatably journalled on said pins, a projection on one of said spaced discs, a fixed abutment adapted for coaction with said projection for limiting the angle of rotation of said spindle and said rollers to a predetermined position and to effect a locking in this position.

3. An operator for operating a device comprising a pair of spaced pivoted levers, said operator comprising a rotatable spindle, means for rotating said spindle at one end thereof and a carrying member fixed on said spindle intermediate the ends thereof, a pair of rollers eccentrically mounted on said carrying member, said rollers being adapted for coaction with said pair of spaced pivotal levers for separation thereof, said rollers being operable on rotation of said spindle, a box housing said operator, adjustable abutments in said box extending in proximity to said carrying member, a projection on said carrying member for coaction with said abutment limiting the rotation of said rollers, whereby said rollers can be turned only to their dead point position in relationship to the lever ends acted on by said rollers or slightly beyond to effect a locking in this position.

References Cited in the file of this patent

UNITED STATES PATENTS

| Number | Name | Date |
|---|---|---|
| Re. 9,860 | Lane | Sept. 6, 1881 |
| 256,236 | Merritt | Apr. 11, 1882 |
| 1,168,765 | Tuttle | Jan. 18, 1916 |
| 1,260,260 | Harmon | Mar. 19, 1918 |
| 1,349,283 | Kollock | Aug. 10, 1920 |
| 1,777,899 | Scott | Oct. 7, 1930 |
| 1,831,789 | Gerber et al. | Nov. 10, 1931 |
| 1,972,484 | Hobbs | Sept. 4, 1934 |
| 2,120,734 | Cotal | June 14, 1938 |
| 2,222,204 | Newman et al. | Nov. 19, 1940 |
| 2,313,768 | Putt | Mar. 16, 1943 |
| 2,485,878 | Hanlon | Oct. 25, 1949 |

FOREIGN PATENTS

| Number | Country | Date |
|---|---|---|
| 883,795 | France | Apr. 5, 1943 |